A. M. CHASE.
SULKY PLOW.
APPLICATION FILED NOV. 23, 1906.
1,024,437.
Patented Apr. 23, 1912.
3 SHEETS—SHEET 2.
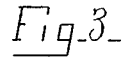
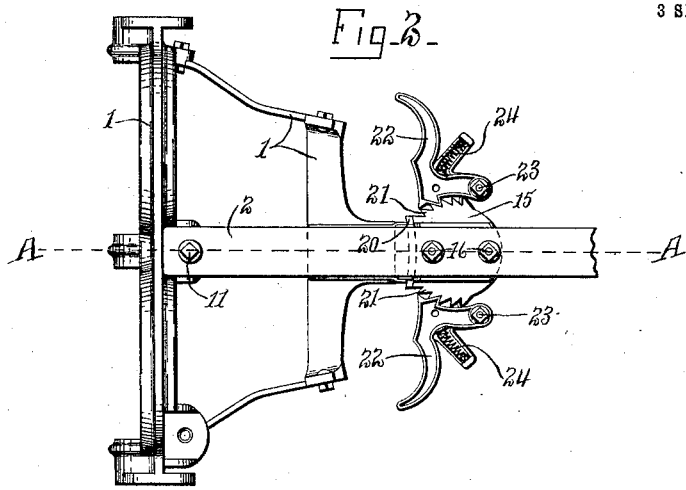
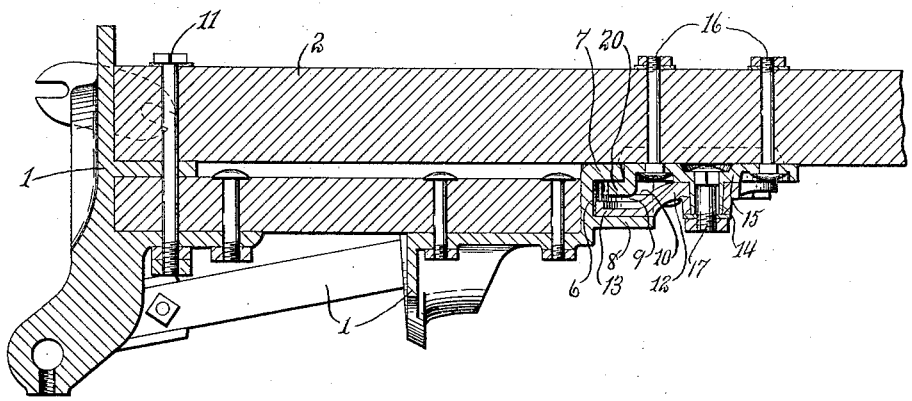
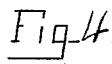
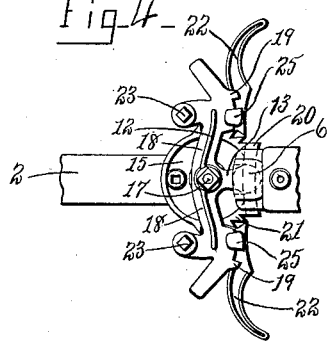
WITNESSES:
Chas. H. Young.
Sidney H. Abbott.
INVENTOR
Aurin M. Chase
BY
Arthur C. Parsons
ATTORNEY

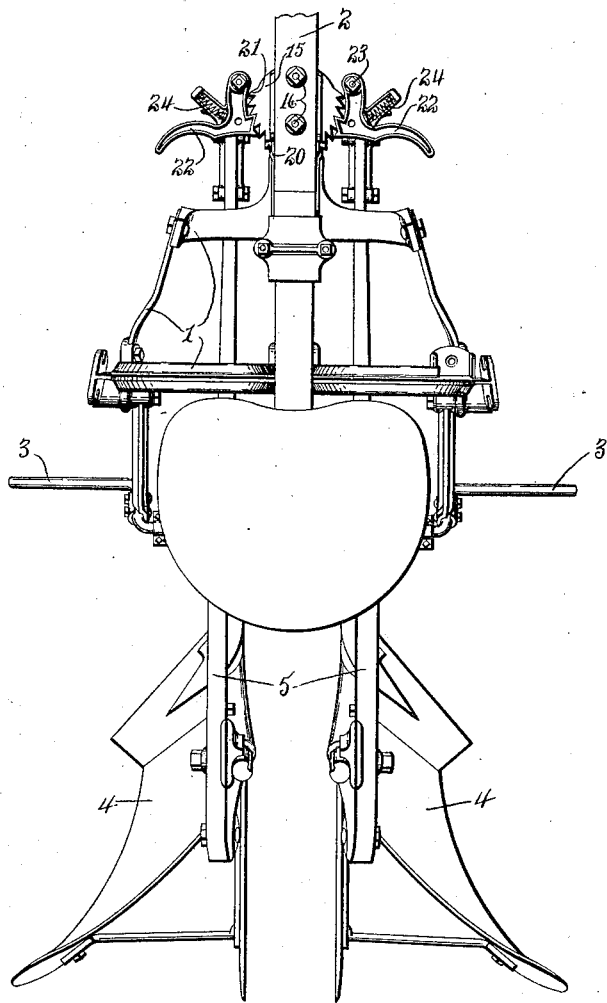

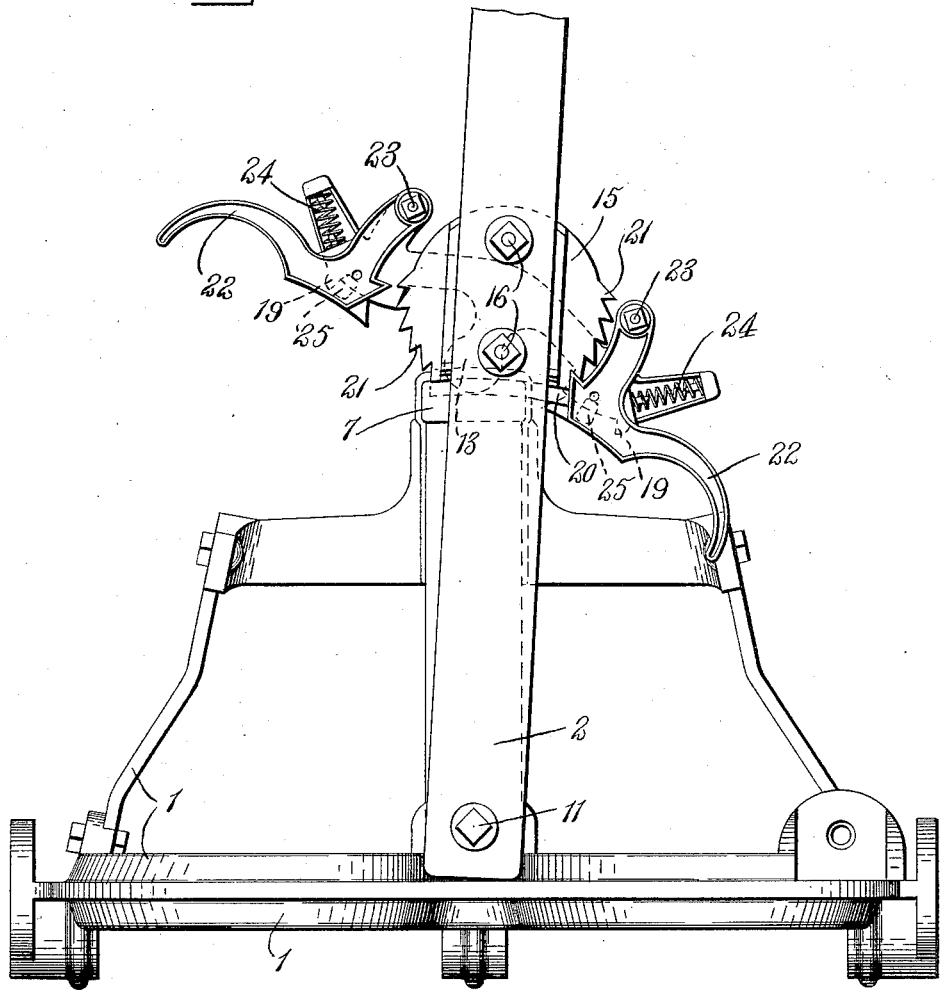

UNITED STATES PATENT OFFICE.

AURIN M. CHASE, OF SYRACUSE, NEW YORK, ASSIGNOR TO SYRACUSE CHILLED PLOW COMPANY, OF SYRACUSE, NEW YORK, A CORPORATION OF NEW YORK.

SULKY-PLOW.

1,024,437.  Specification of Letters Patent.  Patented Apr. 23, 1912.

Application filed November 23, 1906. Serial No. 344,677.

*To all whom it may concern:*

Be it known that I, AURIN M. CHASE, of Syracuse, in the county of Onondaga and State of New York, have invented a certain new and useful Sulky-Plow, of which the following is a specification.

My invention relates to sulky-plows, and has for its object the production of a structure in which the front end of the beam can be moved laterally relatively to the line of draft for effecting the desired travel of the plow, especially on side hills; and to this end the invention consists in the combinations and means hereinafter set forth and claimed.

In describing this invention, reference is had to the accompanying drawing, in which like characters designate corresponding parts in all the views.

Figure 1 is a plan of a portion of a plow embodying my invention. Fig. 2 is a plan of parts of the frame and the pole, and the means for shifting the pole and holding the same in its adjusted position. Fig. 3 is a sectional view on line A—A, Fig. 2. Fig. 4 is an inverted plan of parts shown in Fig. 2. Fig. 5 is an enlarged plan of parts seen in Fig. 1 showing the pole as shifted to the right of a median line.

1 is a suitable frame; 2 is an element as a pole for controlling the direction of the line of draft; 3, 3 are wheel-carrying spindles; 4, 4 right-and left-hand plows; and 5, 5 plow-carrying beams. These parts are all of any desirable form, size and construction, and the beams 5, 5 are raised and lowered by suitable means, not illustrated.

The forward portion of the frame 1 is provided with a socket 6 open at its front, and formed with a top having a forwardly-projecting shoulder 7, and with a bottom 8, and sides 9 rising from the bottom, said sides having engaging surfaces 10 spaced apart from the inner surface of the shoulder 7.

As best seen in Figs. 2 and 3, the pole 2 is pivotally connected at its rear end by a bolt 11, to the frame 1, and is connected to the forward portion of the frame 1, in advance of the bolt 11, by an adjusting member 12 which is pivotally connected to the frame and to the pole, and serves to shift the front end of the pole laterally relatively to the line of draft. This adjusting member is provided with an arm 13 arranged substantially lengthwise of the line of draft, and having its rear end formed with flattened upper and lower faces and a rounding edge, said rear end being extended into the socket 6 above the bottom 8, and coacting with opposing faces of the sides 9 of such socket. The socket 6 and the arm 13 constitute a pivotal connection between the frame 1 and the adjusting member 12, and in effecting the movement of the front end of the pole 2 laterally relatively to the line of draft, the adjusting member 12 moves on the axis of such pivotal connection.

Preferably, the adjusting member 12 is mounted on a bearing 14 arranged in advance of the axis for the rear end of the arm 13 and depending from a connecting member 15 fixed to the pole 2 by suitable means, as bolts 16. A bolt 17 serves to prevent detachment of the adjusting member 12 from the bearing 14. As best seen in Fig. 4, the adjusting member 12 is provided with arms 18 projecting laterally beyond opposite sides of the pole 2, and the rear faces of these arms are formed with shoulders 19. The rear portion of the connecting member 15 is provided with a shoulder 20 spaced apart from the lower face of the pole 2 and movable beneath the shoulder 7 of the socket 6 and between opposing surfaces of said shoulder 7 and the sides 9 of such socket.

The connecting member 15 is preferably provided at opposite sides of the pole 2 with ratchet-shaped teeth 21, and serves as a locking part for coacting with operating and locking parts 22 to hold the member 12 and the pole 2 in their adjusted position. The parts 22 are formed with hook-shaped outer ends, are secured to the arms 18 of the adjusting member 12 at opposite sides of the pole 2 by pivots 23, and are each normally provided with engaging means, as a pawl tooth forced into engagement with the teeth 21 by springs 24. Said parts 22 are movable independently of each other in reverse directions against the action of the springs 24 to disengage their pawl teeth from the ratchet teeth 21 and thereby release the pole 2 so that the desired lateral shifting of its front end may take place, and to also transmit motion to the adjusting member 12 for effecting the shifting of the pole.

In the preferable construction of this invention, the parts 22 have a limited movement on their pivots 23 independently of the adjusting member 12 to move their pawl teeth into and out of engagement with the teeth 21, and are provided with shoulders 25 which coact with the shoulders 19 on the adjusting member 12 after the disengagement of the pawl teeth of the parts 22 from said teeth 21. Consequently, after the disengagement of the parts 22 from the teeth 21, said parts 22 are prevented from movement independently of the adjusting member 12, and the shoulders 25 and 19 transmit motion from the parts 22 to the adjusting member 12 for shifting the same and moving the front end of the pole 2 laterally relatively to the line of draft.

In practice, the operator, by forcing his foot against the hook-shaped outer end of one of the parts 22, moves the same, relatively to the adjusting member, away from the ratchet-shaped teeth 21 previously engaged therewith, and engages the shoulder 25 on said part 22 with the shoulder 19 coacting therewith, after which the further movement of such part 22 shifts the adjusting member 12. When either of the parts 22 is operating to shift the free end of the pole 2 in one direction, the part 22 at the other side of the pole 2 readily slips over the ratchet-shaped teeth 21. After the adjusting member has been moved to the desired position by one of the parts 22, as described, the operator withdraws his foot from such part 22, whereupon the spring 24 coacting with said part 22 forces the same into engagement with the contiguous teeth 21. The teeth 21 and the parts 22 then hold the member 12 and the pole 2 in their adjusted position.

The described construction of adjusting and connecting members is particularly simple and efficient, and affords ample bearing surfaces for resisting the wear and strain to which these parts are subjected.

What I claim is:—

1. In a sulky plow, a frame element, an element for controlling the direction of the line of draft of the plow pivoted to the frame element, an adjusting member carried by one of said elements and connected to the other element for changing the relative position of said elements and thereby changing the line of draft, means for operating the adjusting member, and means for holding said member in its adjusted position, the operating means being initially movable relatively to the adjusting member to disconnect the adjusting member and the holding means and being movable with the adjusting member after said member has been released from the holding means, the movement of the operating means with the adjusting member being a continuation of the initial movement thereof, substantially as and for the purpose specified.

2. In a sulky plow, a frame element, an element for controlling the direction of the line of draft of the plow pivoted to the frame element, an adjusting member pivoted to one of said elements and connected to the other element for changing the relative position of said elements and thereby changing the line of draft, operating means for rocking the adjusting member on its pivot, and means for holding said member in its adjusted position, the operating means including a pivoted part having its pivot arranged parallel to the pivot of the adjusting member and said part being initially movable on its pivot for disconnecting the adjusting member from the holding means and being movable farther on its pivot for operating the adjusting member, substantially as and for the purpose described.

3. In a sulky plow, a frame element, an element connected to the frame element for controlling the direction of the line of draft of the plow, an adjusting member pivoted between its ends to one of said elements and connected to the other element, and being movable on its pivot for changing the relative position of said elements and thereby changing the line of draft, means for rocking the adjusting member on its pivot including operating parts pivoted to the adjusting member on opposite sides of the pivot of said member, each operating part being provided with a pawl tooth, and ratchet teeth fixed from movement with the adjusting member and coöperating with said pawl teeth, substantially as and for the purpose set forth.

4. In a sulky plow, a frame element, an element pivotally connected to the frame element for controlling the direction of the line of draft of the plow, an adjusting member pivoted between its ends to one of said elements and connected to the other element and being movable on its pivot for changing the relative position of said elements and thereby changing the line of draft, means for rocking the adjusting member on its pivot including operating parts pivoted to the adjusting member on opposite sides of the pivot thereof, each of said parts being provided with a pawl tooth, and ratchet teeth fixed from movement with the adjusting member and coöperating with the pawl teeth each operating part being initially movable on its pivot relatively to the adjusting member to disengage its pawl tooth from the ratchet teeth and being thereafter movable with the adjusting member for shifting said member and the other operating part relatively to said ratchet teeth, substantially as and for the purpose specified.

5. In a sulky plow, a frame element, an element connected to the frame element for controlling the direction of the line of draft of the plow, an adjusting member pivoted between its ends to one of said elements and connected to the other element and being movable on its pivot for changing the relative position of said elements and thereby changing the line of draft, means for rocking the adjusting member on its pivot including operating parts pivoted to the adjusting member on opposite sides of the pivot thereof, each of said parts being provided with a pawl tooth, ratchet teeth fixed from movement with the adjusting member and coöperating with the pawl teeth each operating part being initially movable on its pivot relatively to the adjusting member to disengage its pawl tooth from the ratchet teeth and being thereafter movable with the adjusting member for shifting said member and the other operating part relatively to said ratchet teeth, and springs interposed between said operating parts and the adjusting member, substantially as and for the purpose described.

6. In a sulky plow, a frame element, an element connected to the frame element for controlling the direction of the line of draft of the plow, an adjusting member pivoted between its ends to one of said elements and connected to the other element and being movable on its pivot for changing the relative position of said elements and thereby changing the line of draft, means for rocking the adjusting member on its pivot including operating parts pivoted to the adjusting member on opposite sides of the pivot thereof, each of said parts being provided with a pawl tooth, ratchet teeth fixed from movement with the adjusting member and with the pawl teeth each operating part being initially movable on its pivot relatively to the adjusting member to disengage its pawl tooth from the ratchet teeth and being thereafter movable with the adjusting member for shifting said member and the other operating part relatively to said ratchet teeth, and shoulders provided on the adjusting member and on said parts for limiting the pivotal movement of said operating parts after the pawl teeth have been moved out of engagement with the ratchet teeth, substantially as and for the purpose set forth.

7. In a sulky-plow, a frame element, an element pivotally connected to the frame element for controlling the direction of the line of draft of the plow, an adjusting member pivoted between its ends to one of said elements and connected to the other element, and being movable on its pivot for changing the relative position of said elements and thereby changing the line of draft, means for rocking the adjusting member on its pivot including operating parts pivoted to the adjusting member on opposite sides of the pivot thereof, each of said parts being provided with a pawl tooth, ratchet teeth fixed from movement with the adjusting member and coöperating with the pawl teeth, each operating part being initially movable on its pivot relatively to the adjusting member to disengage its pawl tooth from the ratchet teeth and being thereafter movable with the adjusting member for shifting said member and the other operating part relatively to said ratchet teeth, springs interposed between said operating parts and the adjusting member, and shoulders provided on the adjusting member and the operating parts for limiting the pivotal movement of said operating parts after they have been moved against the springs to disengage the pawls from the ratchet teeth, substantially as and for the purpose specified.

8. In a sulky plow, a frame, an element for controlling the direction of the line of draft pivotally connected to the frame, an adjusting member pivotally connected to the frame and to said element for moving said element relatively to the frame and thereby changing the line of draft, means for rocking the adjusting member on its pivot including operating parts pivoted to the adjusting member on opposite sides of the pivot thereof, each of said parts being provided with a pawl tooth, and ratchet teeth fixed from movement with the adjusting member and coöperating with the pawl teeth, substantially as and for the purpose set forth.

9. In a sulky-plow, a frame, an element for controlling the direction of the line of draft pivotally connected to the frame, an adjusting member connected to the frame and to said element for moving said element relatively to the frame, the adjusting member being pivoted intermediate of its ends, a locking part fixed relatively to the adjusting member, additional locking parts pivoted to the adjusting member on opposite sides of its pivot and coacting with the first-mentioned locking part, the locking parts on the adjusting member being movable on their pivots relatively to said member, means on the adjusting member for limiting the movement of such locking parts after said movement of the locking parts on their pivots and forming a solid connection between the locking parts and the adjusting member, and springs for forcing the locking parts on the adjusting member into engagement with the first-mentioned locking parts, substantially as and for the purpose described.

10. In a sulky-plow, a frame provided with a socket open at its front and formed with a bottom and with sides rising from the bottom, a pole pivotally connected to the frame, an adjusting member provided with an arm arranged substantially lengthwise of the line of draft and having its rear end extended within the socket and coacting with said sides, the adjusting member being pivotally connected to the pole in advance of the rear end of said arm, means for rocking the adjusting member and shifting the pole relatively to the frame, and means for holding the adjusting member from movement relatively to the pole, substantially as and for the purpose described.

11. In a sulky-plow, a frame, a pole pivotally connected to the frame, an adjusting member pivotally connected to the frame and to the pole and projecting beyond opposite sides of the pole, means on the adjusting member at opposite sides of the pole for rocking said member and shifting the pole relatively to the frame, and means for holding the adjusting member from movement relatively to the pole, substantially as and for the purpose set forth.

12. In a sulky-plow, a frame, a pole pivotally connected to the frame, an adjusting member provided with an arm arranged substantially lengthwise of the line of draft and having its rear end pivotally connected to the frame, the adjusting member being pivotally connected to the pole in advance of the rear end of said arm, and being provided with arms projecting beyond opposite sides of the pole, means coacting with the last-mentioned arms for rocking the adjusting member and shifting the pole relatively to the frame, and means for holding the adjusting member from movement relatively to the pole, substantially as and for the purpose specified.

13. In a sulky-plow, a frame having a shoulder, a pole pivotally connected to the frame, a connecting member fixed to the pole and having a shoulder for coacting with the first-mentioned shoulder, an adjusting member pivotally connected to the frame and to the connecting member, means for rocking the adjusting member and shifting the pole relatively to the frame, and means for holding the adjusting member from movement relatively to the pole, substantially as and for the purpose described.

14. In a sulky-plow, a frame having surfaces spaced apart, a pole pivotally connected to the frame, a connecting member fixed to the pole and having a shoulder arranged between said surfaces, an adjusting member pivotally connected to the frame and to the connecting member, means for rocking the adjusting member and shifting the pole relatively to the frame, and means for holding the adjusting member from movement relatively to the pole, substantially as and for the purpose set forth.

15. In a sulky-plow, a frame, a pole pivotally connected to the frame, a connecting member fixed to the pole, an adjusting member pivotally connected to the frame and pivotally mounted on the connecting member in advance of the axis of the pivotal connection between the frame and the adjusting member, means for rocking the adjusting member and shifting the pole relatively to the frame, and means for holding the adjusting member from movement relatively to the pole, substantially as and for the purpose specified.

16. In a sulky-plow, a frame having a shoulder, a pole pivotally connected to the frame, a connecting member fixed to the pole and provided with a shoulder spaced apart from the lower face of the pole and arranged beneath the first-mentioned shoulder, said connecting member being formed with a depending bearing beneath the pole in advance of the second-mentioned shoulder, an adjusting member pivotally connected to the frame at the rear of said bearing and pivotally mounted on said bearing, means for rocking the adjusting member and shifting the pole relatively to the frame, and means for holding the adjusting member from movement relatively to the pole, substantially as and for the purpose described.

17. In a sulky-plow, a frame provided with a socket open at its front and formed with a top having a forwardly-projecting shoulder, and with a bottom and sides, said sides having engaging surfaces spaced apart from the inner surface of said shoulder, a pole pivotally connected to the frame, a connecting member fixed to the pole and provided with a shoulder interposed between opposing surfaces of the forwardly-projecting shoulder and the sides of the socket, said connecting member being formed with a depending bearing beneath the pole in advance of the socket, an adjusting member provided with an arm arranged substantially lengthwise of the line of draft and having its rear end extended within the socket and coacting with said sides, the adjusting member being pivotally mounted on said bearing, means for rocking the adjusting member and shifting the pole relatively to the frame, and means for holding the adjusting member from movement relatively to the pole, substantially as and for the purpose set forth.

18. In a sulky-plow, a frame, a pole connected to the frame by a substantially upright pivot, and means for shifting the pole laterally on its pivot relatively to the frame and for holding the pole in its shifted position, said means including locking parts, operable at will independently of each other, and means connecting the locking parts and transmitting motion from one to the other, substantially as and for the purpose set forth.

19. In a sulky-plow, a frame, a pole connected to the frame by a substantially upright pivot, and means for shifting the pole laterally on its pivot relatively to the frame and for holding the pole in its shifted position, said means including a movable element and locking parts carried by said element and being movable at will independently of each other relatively to said element, said element being movable with said locking parts after the movement thereof independently of said element and serving to transmit motion from either locking part to the other, substantially as and for the purpose described.

20. In a sulky-plow, a frame, a pole pivotally connected to the frame, and means for shifting the pole relatively to the frame and for holding the pole in its adjusted position, said means including a locking part fixed to the pole, and locking parts coacting with opposite sides of the first-mentioned locking part and movable in reverse directions from said opposite sides, substantially as and for the purpose described.

21. In a sulky-plow, a frame, a pole pivotally connected to the frame, an adjusting member pivotally connected to the frame and to the pole for shifting the pole relatively to the frame, a locking part fixed to the pole, and locking parts mounted on the adjusting member and coacting with the first-mentioned locking part, substantially as and for the purpose set forth.

22. In a sulky-plow, a frame, a pole pivotally connected to the frame, an adjusting member pivotally connected to the frame and to the pole for shifting the pole relatively to the frame, a locking part fixed to the pole, and locking parts mounted on the adjusting member and coacting with the first-mentioned locking part, the locking parts on the adjusting member being movable relatively thereto into and out of engagement with the first-mentioned locking part and being provided with means coacting with the adjusting member for shifting said adjusting member, substantially as and for the purpose specified.

23. In a sulky-plow, a frame, a pole pivotally connected to the frame, an adjusting member pivotally connected to the frame and to the pole for shifting the pole relatively to the frame, said member being provided with arms projecting beyond opposite sides of the pole, a locking part fixed to the pole, locking parts pivoted on the arms of the adjusting member and coacting with the first-mentioned locking part, the locking parts on the adjusting member being movable on their pivots relatively to said member and being provided with means coacting with the adjusting member for shifting said adjusting member, and springs for forcing the last-mentioned locking parts into engagement with the first-mentioned locking part, substantially as and for the purpose described.

24. In a sulky-plow, a frame provided with a socket open at its front and formed with a top having a forwardly-projecting shoulder, and with a bottom and sides, said sides having engaging surfaces spaced apart from the inner surface of said shoulder, a pole pivotally connected to the frame, a connecting member fixed to the pole and provided with a shoulder interposed between opposing surfaces of the forwardly-projecting shoulder and the sides of the socket, said connecting member being formed with a depending bearing beneath the pole in advance of the socket, and with ratchet-shaped teeth at opposite sides of the pole, an adjusting member provided with an arm arranged substantially lengthwise of the line of draft, and having its rear end extended within the socket above the bottom thereof and coacting with the sides of the socket, the adjusting member being pivotally mounted on said bearing and being provided with arms projecting beyond opposite sides of the pole, locking parts pivoted to the last-mentioned arms of the adjusting member and coacting with the ratchet-shaped teeth of the connecting member, said locking parts being movable on their pivots relatively to the adjusting member, and being provided with means coacting with the adjusting member for shifting said member, and springs for forcing the locking parts into engagement with said ratchet-shaped teeth, substantially as and for the purpose set forth.

In testimony whereof, I have hereunto signed my name in the presence of two attesting witnesses, at Syracuse, in the county of Onondaga, in the State of New York, this 14th day of November, 1906.

AURIN M. CHASE.

Witnesses:
S. DAVIS,
B. ARONSON.

Copies of this patent may be obtained for five cents each, by addressing the "Commissioner of Patents, Washington, D. C."